United States Patent
Ikegaya (10) Patent No.: US 11,993,357 B2
(45) Date of Patent: May 28, 2024

(54) MARINE PROPULSION CONTROL SYSTEM AND MARINE VESSEL CAPABLE OF PERFORMING DYNAMIC POSITIONING CONTROL

(71) Applicant: YAMAHA HATSUDOKI KABUSHIKI KAISHA, Iwata (JP)

(72) Inventor: Yuji Ikegaya, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 268 days.

(21) Appl. No.: 17/669,401

(22) Filed: Feb. 11, 2022

(65) Prior Publication Data
US 2022/0274679 A1   Sep. 1, 2022

(30) Foreign Application Priority Data

Feb. 26, 2021   (JP) .................................. 2021-029927

(51) Int. Cl.
| | |
|---|---|
| *B63H 20/12* | (2006.01) |
| *B63B 79/40* | (2020.01) |
| *B63H 25/42* | (2006.01) |
| *G05D 1/00* | (2006.01) |

(52) U.S. Cl.
CPC .............. *B63H 20/12* (2013.01); *B63B 79/40* (2020.01); *B63H 25/42* (2013.01); *G05D 1/0206* (2013.01)

(58) Field of Classification Search
CPC ..................................................... B63H 20/12
See application file for complete search history.

(56) References Cited

U.S. PATENT DOCUMENTS

| | | | | |
|---|---|---|---|---|
| 8,145,371 | B2 * | 3/2012 | Rae .......................... | B63B 79/10 |
| | | | | 701/21 |
| 8,277,270 | B2 * | 10/2012 | Ryuman ................. | B63H 20/20 |
| | | | | 440/86 |
| 8,682,515 | B2 * | 3/2014 | Ito ......................... | B63H 21/213 |
| | | | | 701/99 |

(Continued)

FOREIGN PATENT DOCUMENTS

| | | |
|---|---|---|
| EP | 2 256 029 B1 | 10/2014 |
| JP | 2009-243590 A | 10/2009 |

(Continued)

OTHER PUBLICATIONS

Official Communication issued in corresponding European Patent Application No. 22156327.3, mailed on Aug. 1, 2022.

*Primary Examiner* — Michael A Berns
(74) *Attorney, Agent, or Firm* — Keating & Bennett, LLP (57) ABSTRACT

A propulsion control system for a marine vessel includes a memory and a controller coupled to the memory. The controller is configured or programmed to, while performing dynamic positioning control of the marine vessel or in a case in which the marine vessel has changed to a mode in which the marine vessel is kept at a certain location, perform deceleration control to reduce a bow direction speed of the marine vessel. Alternatively, the controller is configured or programmed to, in a case in which the marine vessel has changed to a mode in which the marine vessel moves along a predetermined route, when the marine vessel deviates from the predetermined route in a bow direction of the marine vessel, perform deceleration control to prevent the marine vessel from moving in the bow direction.

19 Claims, 9 Drawing Sheets

(56) References Cited

U.S. PATENT DOCUMENTS

| | | | |
|---|---|---|---|
| 10,343,758 B2* | 7/2019 | Andrasko | B63B 79/20 |
| 11,372,411 B1* | 6/2022 | Derginer | B63B 39/061 |
| 11,472,289 B2* | 10/2022 | Osaki | B63H 21/21 |
| 2009/0247025 A1 | 10/2009 | Ryuman | |
| 2010/0023192 A1 | 1/2010 | Rae et al. | |
| 2021/0248912 A1* | 8/2021 | Tomita | B63B 43/18 |
| 2022/0017203 A1* | 1/2022 | Pedersen | G05D 1/0208 |
| 2022/0194538 A1* | 6/2022 | Tao | B63H 20/007 |
| 2022/0274679 A1* | 9/2022 | Ikegaya | B63B 79/40 |
| 2022/0374015 A1* | 11/2022 | Ikegaya | B63B 79/40 |
| 2022/0382281 A1* | 12/2022 | Ito | G05D 1/0206 |
| 2022/0402583 A1* | 12/2022 | Okamoto | B63C 9/0005 |

FOREIGN PATENT DOCUMENTS

| | | |
|---|---|---|
| JP | 5191199 B2 | 4/2013 |
| JP | 2020-147176 A | 9/2020 |

* cited by examiner

MARINE PROPULSION CONTROL SYSTEM AND MARINE VESSEL CAPABLE OF PERFORMING DYNAMIC POSITIONING CONTROL

CROSS REFERENCE TO RELATED APPLICATIONS

This application claims the benefit of priority to Japanese Patent Application No. 2021-029927 filed on Feb. 26, 2021. The entire contents of this application are hereby incorporated herein by reference.

BACKGROUND OF THE INVENTION

1. Field of the Invention

The present invention relates to marine propulsion control systems and marine vessels capable of performing dynamic positioning control.

2. Description of the Related Art

There are known marine vessels equipped with a marine propulsion control system that performs dynamic positioning control in which the thrust of an engine and the acting direction (steering direction) of the thrust are integrally controlled to keep the marine vessel in the vicinity of a target position (see Japanese Laid-open Patent Publication (Kokai) No. 2009-243590, for example). During execution of the dynamic positioning control, the thrust of the engine is reduced to minimize sudden movement of the marine vessel and avoid discomfort of passengers enjoying fishing or having a party on the marine vessel.

While dynamic positioning control is started in response to an operation of a button or a switch by a vessel operator, the vessel operator may start the dynamic positioning control by operating the button or the switch before the movement of the marine vessel in the bow direction stops.

Many marine vessels equipped with a marine propulsion control system that performs dynamic positioning control are relatively large cruisers. Such large cruisers have large inertia forces and reduced thrust is used during dynamic positioning control. If the cruisers still move in the bow direction, it takes time to completely stop the movement in the bow direction with reduced thrust in the reverse direction that can be generated during dynamic positioning control. As a result, the marine vessels may depart from the target position significantly. Thus, there is room for improvement from the viewpoint of achieving dynamic positioning control.

SUMMARY OF THE INVENTION

Preferred embodiments of the present invention provide marine propulsion control systems and marine vessels that are each able to smoothly perform dynamic positioning control.

According to a preferred embodiment of the present invention, a propulsion control system for a marine vessel including at least one power source to generate thrust includes a memory and a controller coupled to the memory. The controller is configured or programmed to control movement of the marine vessel by the at least one power source, and while performing dynamic positioning control of the marine vessel, perform deceleration control to reduce a speed of the marine vessel in a bow direction (bow direction speed).

According to another preferred embodiment of the present invention, a marine vessel includes at least one power source to generate thrust and the above-described propulsion control system.

According to another preferred embodiment of the present invention, a propulsion control system for a marine vessel including at least one power source to generate thrust includes a memory and a controller coupled to the memory. The controller is configured or programmed to control movement of the marine vessel by the at least one power source, and in a case in which the marine vessel has changed to a mode in which the marine vessel is kept at a certain location, perform deceleration control to reduce a bow direction speed of the marine vessel.

According to another preferred embodiment of the present invention, a marine vessel includes at least one power source to generate thrust and the above-described propulsion control system.

According to another preferred embodiment of the present invention, a propulsion control system for a marine vessel including at least one power source to generate thrust includes a memory and a controller coupled to the memory. The controller is configured or programmed to control movement of the marine vessel by the at least one power source, and in a case in which the marine vessel has changed to a mode in which the marine vessel is guided along a predetermined route, when the marine vessel deviates from the predetermined route in a bow direction of the marine vessel, perform deceleration control to prevent the marine vessel from moving in the bow direction.

According to another preferred embodiment of the present invention, a marine vessel includes at least one power source to generate thrust and the above-described propulsion control system.

According to preferred embodiments of the present invention, while the dynamic positioning control of the marine vessel is performed, or in a case in which the marine vessel has changed to a mode in which the marine vessel is kept at a certain location, the deceleration control to reduce the bow direction speed of the marine vessel is performed by the marine propulsion control system. This prevents the marine vessel from departing too far from the target position for dynamic positioning control. Further, in a case in which the marine vessel has changed to a mode in which the marine vessel is guided along a predetermined route, when the marine vessel deviates from the predetermined route in a bow direction of the marine vessel, deceleration control to prevent the marine vessel from moving in the bow direction is performed by the marine propulsion control system. This prevents the marine vessel from departing too far from the predetermined route during dynamic positioning control. As a result, dynamic positioning control is performed smoothly.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, preferred embodiments of the present invention will be described with reference to the drawings.

Figure 1:
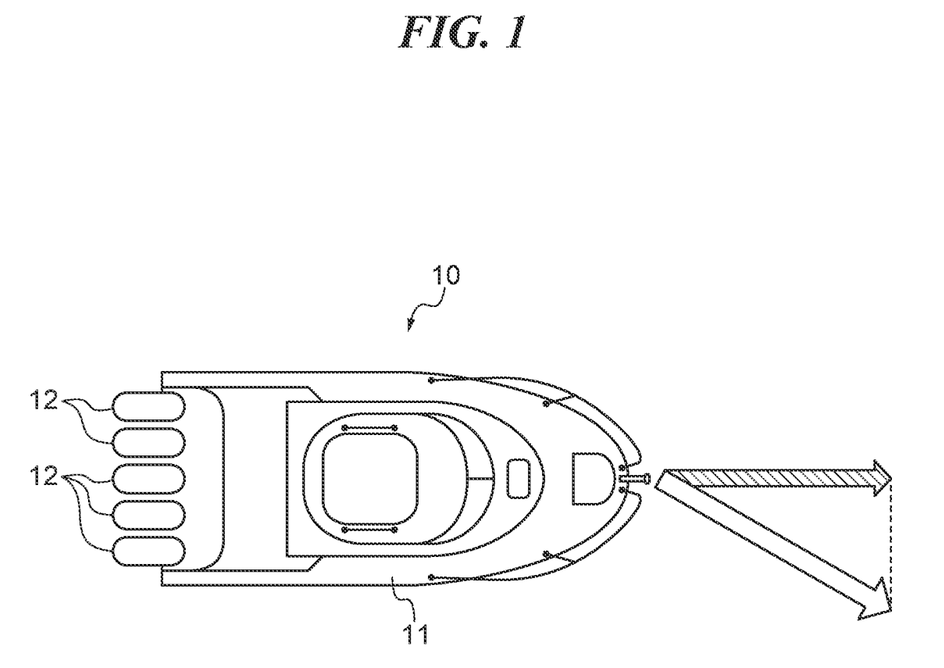
FIG. 1 is a plan view schematically illustrating a marine vessel equipped with a marine propulsion control system according to a preferred embodiment of the present invention.

FIG. 1 is a plan view schematically illustrating a marine vessel on which a marine propulsion control system according to a preferred embodiment of the present invention is installed. In FIG. 1, a marine vessel 10 is, for example, a planing boat, and includes a hull 11 and five outboard motors 12. The outboard motors 12 are attached to the stern of the hull 11. Each outboard motor 12 includes an engine and a propeller, wherein the engine defines and functions as a drive source. Each outboard motor 12 generates thrust with the propeller rotated by the driving force of the engine. Note that the marine vessel to which the outboard motors 12 are provided is not limited to a planing boat, and may be, for example, a displacement type marine vessel. Further, the number of outboard motors 12 provided on the marine vessel 10 as power sources is not limited to five, and may be at least one or more. The orientation of the outboard motors 12 with respect to the hull 11 is able to be changed by a steering mechanism, thus changing the acting direction of the thrust of the outboard motors 12 to change the traveling direction of the marine vessel 10.

Figure 2:
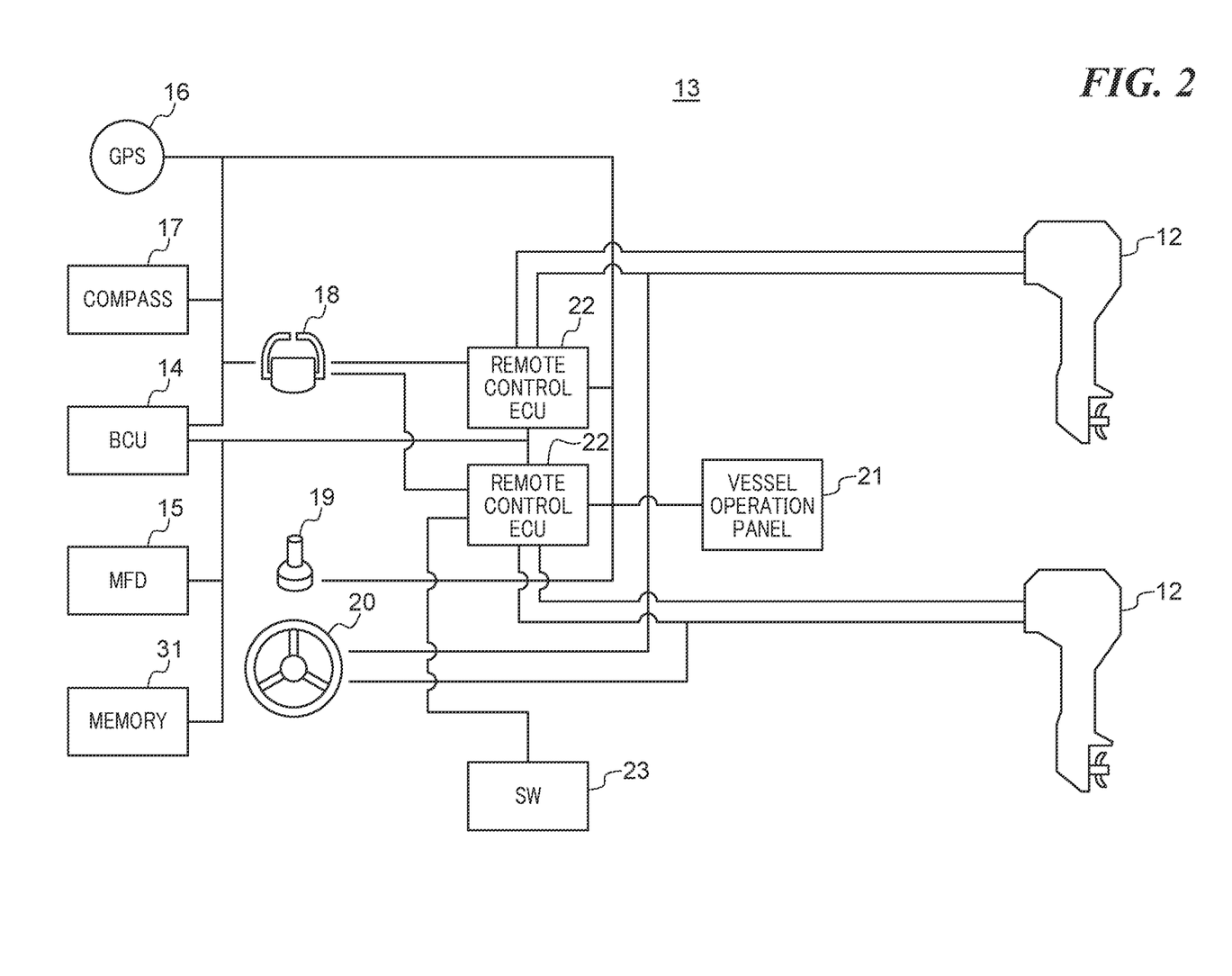
FIG. 2 is a block diagram schematically describing the configuration of the marine propulsion control system installed on the marine vessel in FIG. 1.

FIG. 2 is a block diagram for schematically describing the configuration of a marine propulsion control system 13 installed on the marine vessel 10 in FIG. 1. In FIG. 2, only two outboard motors 12 are purposely depicted for ease of understanding.

In FIG. 2, the marine propulsion control system 13 includes the outboard motors 12, a boat control unit (BCU) 14 (controller), a multi-function display (MFD) 15, a GPS 16, a compass (heading unit) 17, a remote control 18, a joystick 19, a steering wheel 20, a vessel operation panel 21, remote control ECUs 22 (power source controllers), a switch (SW) 23, and a memory 31. The components of the marine propulsion control system 13 are communicatively connected to one another.

The GPS 16 determines the current position of the marine vessel 10 and transmits the current position of the marine vessel 10 to the BCU 14. The compass 17 determines the traveling direction of the marine vessel 10 and transmits the traveling direction of the marine vessel 10 to the BCU 14. The MFD 15 is a display indicating a vessel speed and an engine speed, and includes a touch panel to accept instructions from a vessel operator. The accepted instructions are transmitted to the BCU 14. The memory 31 stores control programs and data necessary for the operation of the BCU 14.

Figure 3A:
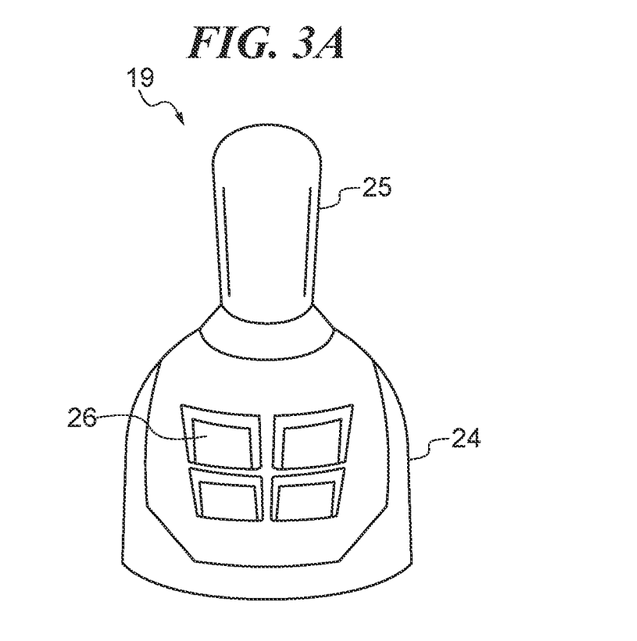
FIGS. 3A and 3B are external views schematically illustrating configurations of a remote control and a joystick in FIG. 2.
Figure 3B:
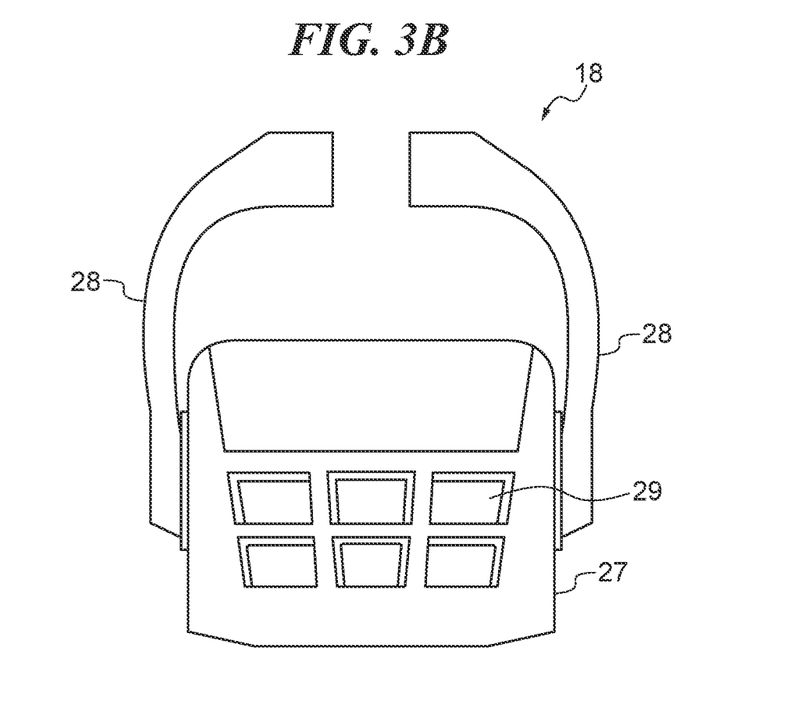

FIGS. 3A and 3B are external views schematically illustrating configurations of the remote control 18 and the joystick 19 in FIG. 2. FIG. 3A illustrates the joystick 19 and FIG. 3B illustrates the remote control 18.

In FIG. 3A, the joystick 19 includes a base 24, a stick 25 attached to the top of the base 24, and multiple buttons 26 provided on the base 24. The stick 25 is tiltable relative to the base 24 so that a vessel operator is able to intuitively steer the marine vessel 10. For example, when the stick 25 is moved in the back and forth direction, the joystick 19 emits a signal to move the marine vessel 10 in the back and forth direction, and when the stick 25 is moved in the left and right direction, the joystick 19 emits a signal to move the marine vessel 10 in the left and right direction. When the stick 25 is pivoted, the joystick 19 emits a signal to pivot the marine vessel 10. The signal from the joystick 19 is transmitted to the remote control ECUs 22 and the BCU 14.

To one of the buttons 26, an instruction to start or end dynamic positioning control is assigned, and the joystick 19 transmits an instruction signal to start or end dynamic positioning control to the remote control ECUs 22 and the BCU 14 in response to depression of the button 26. Note that multiple modes may be provided during the dynamic positioning control, and the mode to be set may change from one mode to another each time the button 26 is depressed. Examples of the multiple modes that are able to be set during the dynamic positioning control include Fish Point, Stay Point, Drift Point, and Drift Point Track (all of which are registered trademarks in the United States and other countries). In the Fish Point mode, the thrust of the outboard motors 12 is controlled to keep the marine vessel 10 at the target position (a certain location). In the Stay Point mode, the thrust of the outboard motors 12 and the acting direction of the thrust are integrally controlled to keep the marine vessel 10 in the target position and maintain the bow direction in a particular direction. In the Drift Point mode, the acting direction of the thrust of the outboard motors 12 is controlled to maintain the bow direction in a particular direction. In the Drift Point Track mode, the thrust of the outboard motors 12 and the acting direction of the thrust are integrally controlled to maintain the bow direction in a particular direction and guide the marine vessel 10 along a route (predetermined route) previously input by the vessel operator on the MFD 15.

In FIG. 3B, the remote control 18 includes a base 27, levers 28 attached to sides of the base 27, and multiple buttons 29 provided on the base 27. The levers 28 are movable back and forth with respect to the base 27, and when the vessel operator moves the levers 28 forward, the remote control 18 emits a signal to move the marine vessel 10 in the bow direction, and when the vessel operator moves the levers 28 backward, the remote control 18 emits a signal to move the marine vessel 10 in the stern direction. The signal from the remote control 18 is transmitted to the remote control ECUs 22 and the BCU 14.

To one of the buttons 29, an instruction to start or end dynamic positioning control is assigned, and the remote control 18 transmits an instruction signal to start or end dynamic positioning control to the remote control ECUs 22 and the BCU 14 in response to the depression of the button 29. Note that similarly to the button 26, the mode of dynamic positioning control may change from one mode to another each time the button 29 is depressed.

Returning to FIG. 2, the steering wheel 20 accepts the steering operation of a vessel operator, and transmits a steering angle signal corresponding to the accepted operation to the remote control ECUs 22. The SW 23 accepts an instruction to turn on or start the outboard motors 12, and transmits a signal corresponding to the accepted instruction to the remote control ECUs 22.

The BCU 14 determines the situation of the marine vessel 10 on the basis of the signals transmitted from the components of the marine propulsion control system 13, determines the thrust to be generated by the outboard motors 12 and the acting direction of the thrust to be taken, and transmits the result to the remote control ECUs 22. That is, the BCU 14 controls the movement of the marine vessel 10 by the outboard motors 12 which define and function as a power source. The BCU 14 further performs deceleration control, which will be described below, while performing dynamic positioning control of the marine vessel 10. Remote control ECUs 22 are provided one for every outboard motor 12, and control the thrust of the respective outboard motors 12 and the acting direction of the thrust according to a signal transmitted from the BCU 14, the remote control 18, the joystick 19, or the like.

Figure 4A:
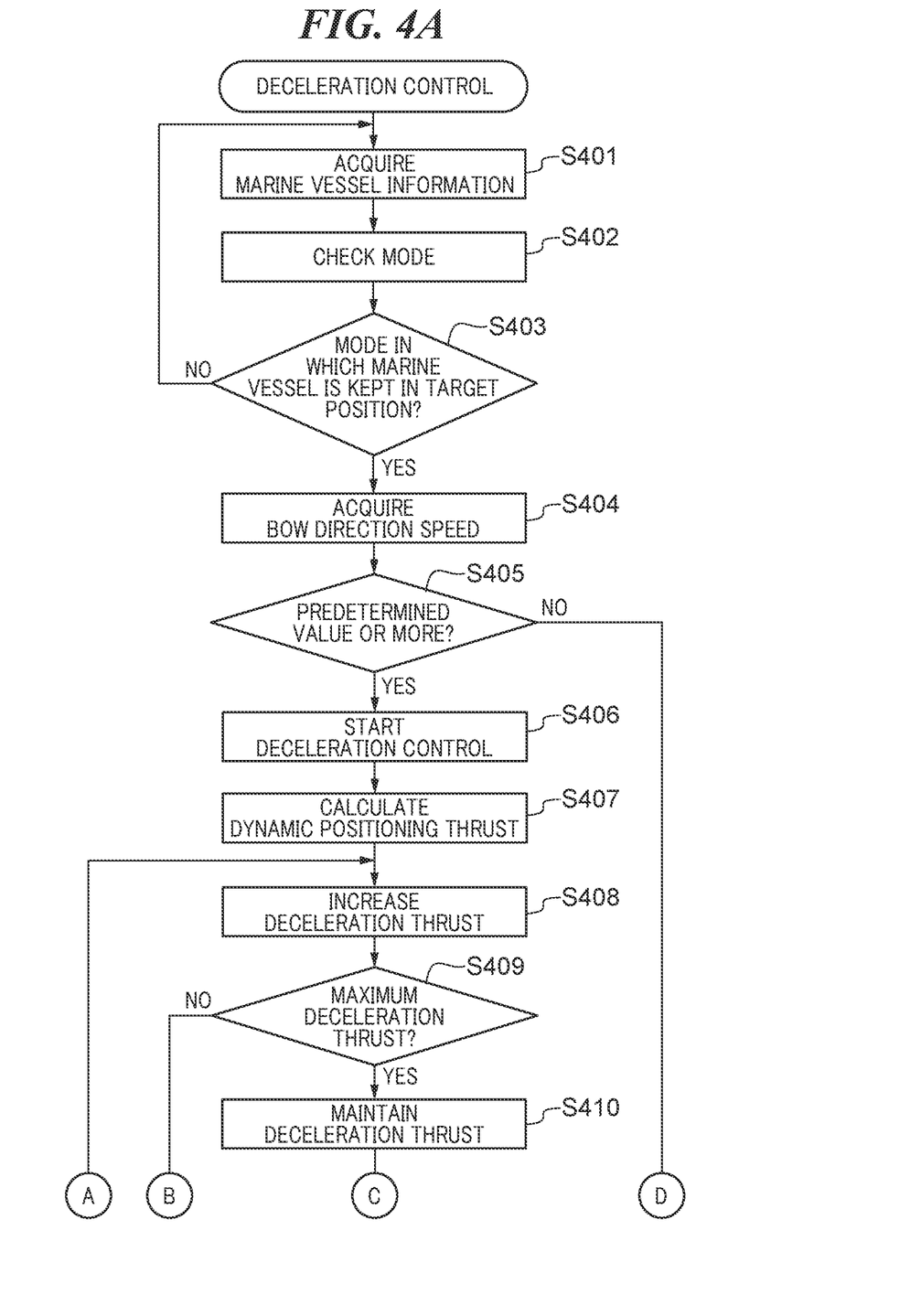
FIGS. 4A and 4B are flowcharts illustrating a deceleration control process performed by a BCU of FIG. 2.
Figure 4B:
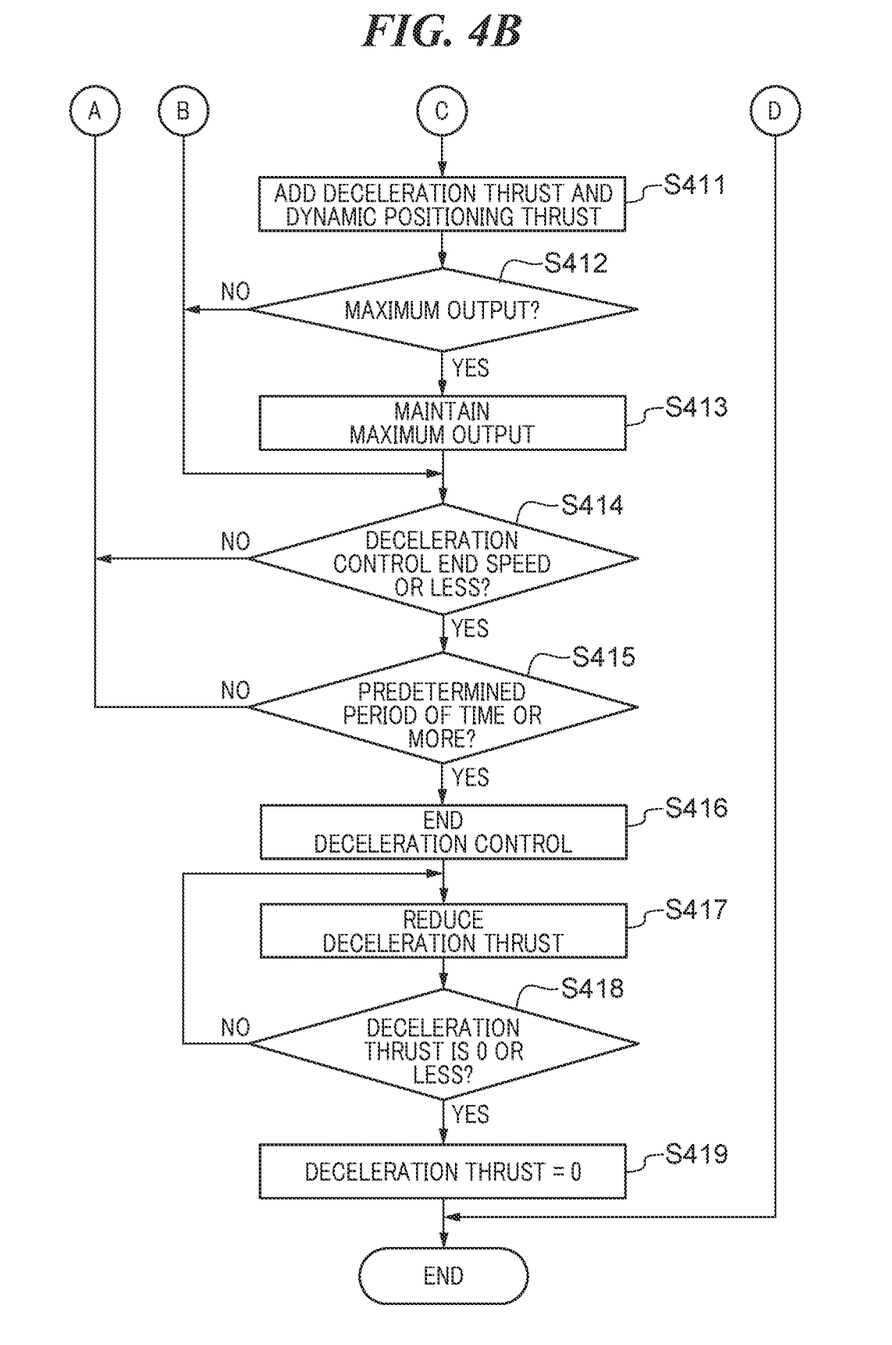

FIGS. 4A and 4B are flowcharts illustrating a deceleration control process performed by the BCU 14 in FIG. 2. This process is performed while the dynamic positioning control is performed, in other words, after the button 26 of the joystick 19 or the button 29 of the remote control 18 is depressed to perform the dynamic positioning control.

First, the BCU 14 acquires information on the position, the vessel speed, and the traveling direction (see white arrow of FIG. 1) of the marine vessel 10 from the GPS 16 and the compass 17, and acquires information on the number, the model (specifications), the engine speed, and the like of the outboard motors 12 provided on the marine vessel 10 from the remote control ECUs 22 (step S401). Further, the BCU 14 checks which mode the dynamic positioning control is currently set to on the basis of the number of times the button 26 of the remote control 18 or the button 29 of the joystick 19 is depressed (step S402).

Next, the BCU 14 determines whether or not the set mode is a mode in which the marine vessel 10 is kept at the target position (step S403). Specifically, the BCU 14 determines whether or not the set mode corresponds to either the Fish Point mode or the Stay Point mode. If the set mode is neither the Fish Point mode nor the Stay Point mode, the process returns to step S401. On the other hand, if the set mode corresponds to either the Fish Point mode or the Stay Point mode, the BCU 14 acquires the speed in the bow direction (see the hatched arrow of FIG. 1) on the basis of the vessel speed and the traveling direction of the marine vessel 10 (step S404).

Thereafter, the BCU 14 determines whether or not the speed in the bow direction is a predetermined value or more (step S405). In a case in which the bow direction is less than the predetermined value, the BCU 14 ends this process. On the other hand, in a case in which the speed in the bow direction is the predetermined value or more, the BCU 14 changes a deceleration control execution flag to ON, and starts deceleration control that reduces the speed of the marine vessel 10 in the bow direction (step S406). Here, the predetermined value (predetermined speed) is a speed in the bow direction at which the marine vessel 10 is able to be kept in the vicinity of the target position even with the thrust in the reverse direction that is able to be generated during dynamic positioning control. Note that the predetermined value varies according to the number and model (specifications) of the outboard motors 12 provided on the marine vessel 10. As a result, the BCU 14 is able to determine whether or not to perform deceleration control according to the information about the specifications and number of the outboard motors 12 which define and function as power sources. For example, in a case in which the number of outboard motors 12 provided on the marine vessel 10 is large and the outboard motors 12 are large, it is expected that the hull 11 is also large and thus the inertia force of the marine vessel 10 is large. Therefore, the predetermined value is set to be relatively small so that deceleration control is actively performed. On the other hand, in a case in which the number of outboard motors 12 provided on the marine vessel 10 is small and the outboard motors 12 are small, it is expected that the hull 11 is also small and thus the inertia force of the marine vessel 10 is small. Therefore, it is not necessary to actively perform deceleration control, and it is considered that the marine vessel 10 is able to be kept in the vicinity of the target position even with the thrust in the reverse direction that is able to be generated during dynamic positioning control. Accordingly, in this case, the predetermined value is set to be relatively large. By setting the predetermined value in this manner, it is possible to keep the marine vessel 10 from passing the target position or from suddenly decelerating.

Next, the BCU 14 calculates the thrust necessary to perform the dynamic positioning control in the Fish Point mode or the Stay Point mode on the basis of the position, the vessel speed, and the traveling direction of the marine vessel 10 (step S407). Specifically, the BCU 14 calculates the thrust (hereinafter referred to as "dynamic positioning thrust") necessary to move the marine vessel 10 so as to eliminate the difference between the current position and the target position of the marine vessel 10 for each outboard motor 12. Note that the maximum value of the dynamic positioning thrust that is able to be generated in the Fish Point mode or the Stay Point mode is set in advance by a vessel operator using the button 29 of the remote control 18 or the button 26 of the joystick 19. In a case in which the target position is set in an area of the sea where the tidal current is gentle, the maximum value of the dynamic positioning thrust is set to be relatively small so that the marine vessel 10 does not suddenly accelerate and surprise the passengers. In another case in which the target position is set in an area of the sea where the tidal current is strong, the maximum value of the dynamic positioning thrust is set to be relatively large so that the marine vessel 10 is able to stay at the target position against the tidal current.

Thereafter, the BCU 14 increases the deceleration thrust generated in each outboard motor 12 at a predetermined change rate (step S408), and determines whether or not the deceleration thrust has reached a preset maximum deceleration thrust (step S409). Here, the maximum deceleration thrust varies according to the maximum value of the dynamic positioning thrust and the model (specifications) of each outboard motor 12. In a case in which the maximum value of the dynamic positioning thrust is set to be relatively small, the maximum deceleration thrust is also set to be relatively small, so that the deceleration thrust does not greatly exceed the dynamic positioning thrust and cause sudden deceleration of the marine vessel 10. In another case in which the outboard motors 12 are large, the inertia force of the marine vessel 10 is expected to be large, and thus, the maximum deceleration thrust is set to be relatively large. In another case in which the outboard motors 12 are small, the inertia force of the marine vessel 10 is expected to be small, and thus, the maximum deceleration thrust is set to be relatively small.

If the deceleration thrust has not reached the preset maximum deceleration thrust, the process proceeds to step S414 to be described below, and if the deceleration thrust has reached the predetermined maximum deceleration thrust, the BCU 14 maintains the deceleration thrust at the maximum deceleration thrust (step S410). By maintaining the deceleration thrust at the maximum deceleration thrust, it is possible to prevent the deceleration thrust from becoming excessively large and requiring time to reduce the deceleration thrust when ending the deceleration control. This allows the deceleration control to be ended with a satisfactory response.

Figure 5:
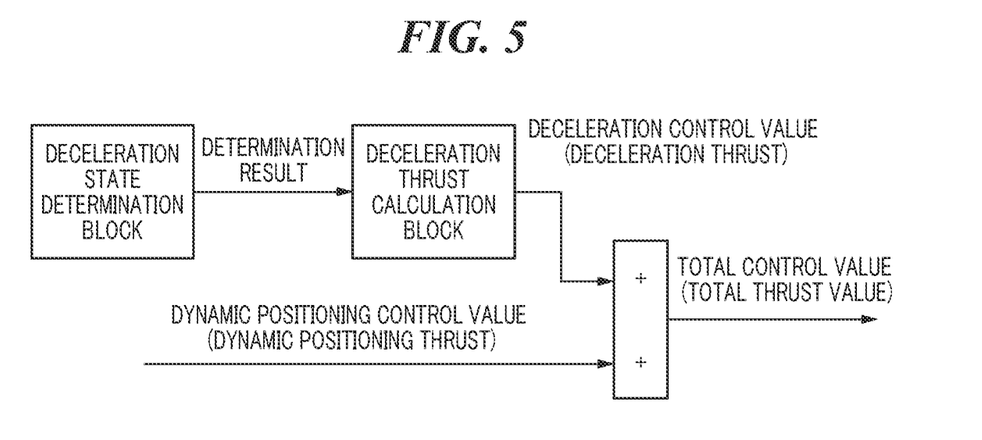
FIG. 5 is a block diagram for describing adding a deceleration thrust and a dynamic positioning thrust in step S411 of FIG. 4B.

Next, the BCU 14 adds the deceleration thrust and the dynamic positioning thrust (step S411). FIG. 5 is a block diagram for describing the adding the deceleration thrust and the dynamic positioning thrust in step S411 of FIG. 4B, which is performed for each outboard motor 12. First, a deceleration state determination block of the BCU 14 makes the determination in step S405, and if the speed in the bow direction is a predetermined value or more, the block transmits a determination result such as "change deceleration control execution flag to ON" to a deceleration thrust calculation block of the BCU 14. When receiving the determination result "change deceleration control execution flag to ON", the deceleration thrust calculation block calculates a deceleration control value (second control value) corresponding to the deceleration thrust. As described in step S408, the deceleration control value is changed so as to increase the deceleration thrust. The BCU 14 further calculates a dynamic positioning control value (first control value) corresponding to the dynamic positioning thrust, and outputs (transmits) a total control value obtained by adding the deceleration control value and the dynamic positioning control value to the remote control ECU 22. This total control value corresponds to a total thrust value obtained by adding the deceleration thrust and the dynamic positioning thrust. Then, the remote control ECU 22 controls the thrust of the corresponding outboard motor 12 on the basis of the input total control value.

Incidentally, in a case in which the target position exists in the bow direction in the Fish Point mode or the Stay Point mode, a dynamic positioning thrust acting in the bow direction may be calculated. At this time, when the calculated absolute value of the dynamic positioning thrust is larger than the absolute value of the deceleration thrust acting in the stern direction, the marine vessel 10 may not stop and may pass the target position. To compensate for this, the BCU 14 adjusts the deceleration control value and the dynamic positioning control value so that each outboard motor 12 generates thrust based on the total control value in a direction opposite to the bow direction (stern direction). For example, the BCU 14 adjusts the total control value to cause each outboard motor 12 to generate thrust acting in the stern direction by increasing the deceleration control value or decreasing the dynamic positioning control value, and keeps the marine vessel 10 from passing the target position. Note that the total control value of FIG. 5 is calculated separately for each outboard motor 12, and different total control values may be output to the remote control ECUs 22 because the dynamic positioning thrust may be different for each outboard motor 12 depending on the mode.

Thereafter, the BCU 14 determines whether or not the total thrust value obtained by adding the deceleration thrust and the dynamic positioning thrust reaches the maximum output of the outboard motor 12 of the model acquired in step 401 (step S412). If the total thrust value has reached the maximum output, the BCU 14 maintains the total thrust value at the maximum output (step S413). The maximum output here is an output value determined by the BCU 14 for each model of the outboard motor 12, and is, for example, a maximum value of the output allowed to be exhibited by the outboard motor 12 during execution of the dynamic positioning control. On the other hand, if the total thrust value has not reached the maximum output, step S413 is skipped.

Next, the BCU 14 determines whether or not the speed in the bow direction has become equal to or less than the deceleration control end speed (a second predetermined speed) (step S414). Here, the deceleration control end speed is a speed in the bow direction at which the marine vessel 10 is able to be stopped in a short period of time even with the thrust in the reverse direction that is able to be generated during dynamic positioning control. Note that the deceleration control end speed varies according to the number and model of the outboard motors 12 provided on the marine vessel 10. In a case in which the number of outboard motors 12 provided on the marine vessel 10 is large and the outboard motors 12 are large, it is expected that the inertia force of the marine vessel 10 is large. Thus, the deceleration control end speed is set to be relatively low so that the deceleration control is easily continued. In another case in which the number of outboard motors 12 provided on the marine vessel 10 is small and the outboard motors 12 are small, it is expected that the inertia force of the marine vessel 10 is small. Thus, it is not necessary to continue the deceleration control for a long time, and the deceleration control end speed is set to be relatively high.

If it is determined in step S414 that the speed in the bow direction is still higher than the deceleration control end speed, the process returns to step S408, and the BCU 14 continues the deceleration control and increases the deceleration thrust. On the other hand, if the speed in the bow direction is the deceleration control end speed or less, the BCU 14 determines whether or not the duration of the deceleration control from the start of the deceleration control in step S406 has reached a predetermined period of time or more (step S415). The predetermined period of time here corresponds to a period of time sufficient to stop the marine vessel 10 by deceleration control if there is no influence of the tidal current on the marine vessel 10. Note that the predetermined period of time varies according to the number and model of the outboard motors 12 provided on the marine vessel 10. In a case in which the number of outboard motors 12 provided on the marine vessel 10 is large and the outboard motors 12 are large, the inertia force of the marine vessel 10 is large, and the period of time required to stop the marine vessel 10 by the deceleration control becomes long. Thus, the predetermined period of time is set to be relatively long. In another case in which the number of outboard motors 12 provided on the marine vessel 10 is small and the outboard motors 12 are small, the inertia force of the marine vessel 10 is small, and the period of time required to stop the marine vessel 10 by deceleration control becomes short. Thus, the predetermined period of time is set to be relatively short.

If it is determined in step S415 that the duration of the deceleration control is less than the predetermined period of time, the process returns to step S408, and the BCU 14 continues the deceleration control and increases the deceleration thrust. On the other hand, when the duration of the deceleration control is the predetermined period of time or more, the BCU 14 changes the deceleration control execution flag to OFF, ends the deceleration control (step S416), and reduces the deceleration thrust (step S417). Next, the BCU 14 determines whether or not the deceleration thrust has become 0 or less (step S418). If the deceleration thrust is not 0 or less, the process returns to step S417, and the BCU 14 further reduces the deceleration thrust. On the other hand, if the deceleration thrust is 0 or less, the BCU 14 sets the deceleration thrust to 0 again (step S419), and ends this process.

Figure 6:
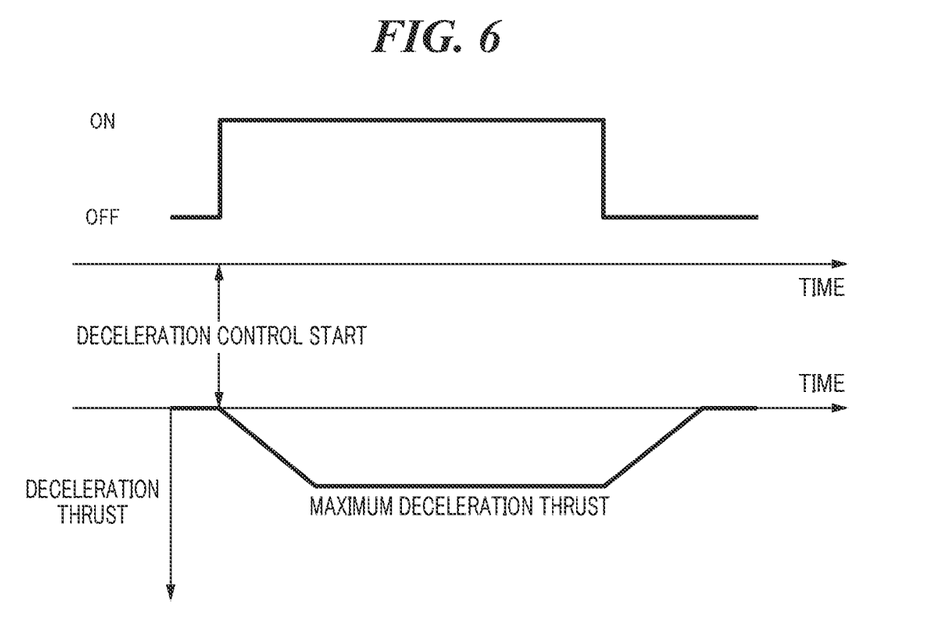
FIG. 6 is a graph for describing deceleration control in steps S406 to S418 in FIGS. 4A and 4B.

FIG. 6 is a graph for describing the deceleration control in steps S406 to S418 in FIGS. 4A and 4B. In FIG. 6, the upper graph illustrates the transition of the deceleration control execution flag, and the lower graph illustrates the transition of the deceleration thrust.

First, the BCU 14 changes the deceleration control execution flag from OFF to ON on the basis of the determination result of step S405, and starts deceleration control. At this time (at the start of the deceleration control), the BCU 14 does not rapidly increase the deceleration thrust, but gradually increases the deceleration thrust. That is, the BCU 14 increases the deceleration thrust at a predetermined change rate (increase change rate). As a result, the marine vessel 10 is prevented from suddenly decelerating and surprising the passengers. The gradual increase of the deceleration thrust is achieved by repeating the flow of step S408, NO in step S409, and NO in step S414 or S415. Note that the increase change rate of the deceleration thrust varies according to the number and model (specifications) of the outboard motors 12 provided on the marine vessel 10. In a case in which the number of outboard motors 12 provided on the marine vessel 10 is small and the outboard motors 12 are small, it is expected that the inertia force of the marine vessel 10 is small. Thus, the deceleration thrust is more gently increased so that the marine vessel 10 does not suddenly decelerate. In another case in which the number of outboard motors 12 provided on the marine vessel 10 is large and the outboard motors 12 are large, it is expected that the inertia force of the marine vessel 10 is large. Thus, the deceleration thrust is increased slightly quickly so as to stop the marine vessel 10 in a short period of time.

Thereafter, the BCU 14 maintains the deceleration thrust at the maximum deceleration thrust on the basis of the determination result of step S409. Then, the BCU 14 changes the deceleration control execution flag from ON to OFF on the basis of the determination result of step S415, and ends the deceleration control. At this time, the BCU 14 does not sharply reduce the deceleration thrust, but gradually reduces the deceleration thrust. The gradual reduction of the deceleration thrust is achieved by repeating the flow of step S417 and NO in step S418. Note that around the end of the deceleration control, a sufficient period of time elapses from the start of the dynamic positioning control, and a sufficient dynamic positioning thrust is generated. Thus, even if the deceleration thrust is rapidly reduced, the behavior of the marine vessel 10 is not disturbed. Accordingly, the deceleration thrust is able to be rapidly reduced.

Figure 7A:
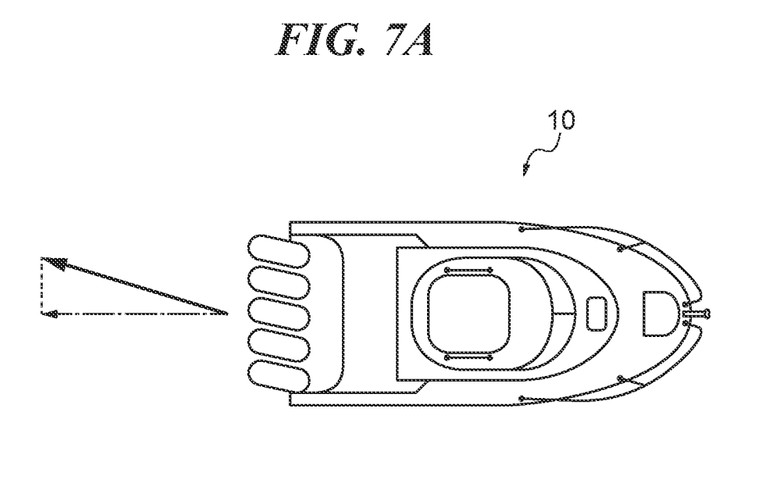
FIGS. 7A and 7B are diagrams for describing the acting direction of the thrust of outboard motors during deceleration control.

In a case in which the BCU 14 performs deceleration control under the condition that the acting direction of the thrust of each outboard motor 12 is not neutral and is toward the starboard side or the port side, the deceleration thrust indicated by the black arrow in FIG. 7A is not in direct opposition to the bow direction of the marine vessel 10, and a component force of the deceleration thrust (indicated by long dashed short dashed line in FIG. 7A) is in direct opposition to the bow direction of the marine vessel 10. Accordingly, not all the generated deceleration thrust is used for deceleration of the speed in the bow direction, and a yaw moment is generated in the marine vessel 10 that disturbs the course of the marine vessel 10.

Figure 7B:
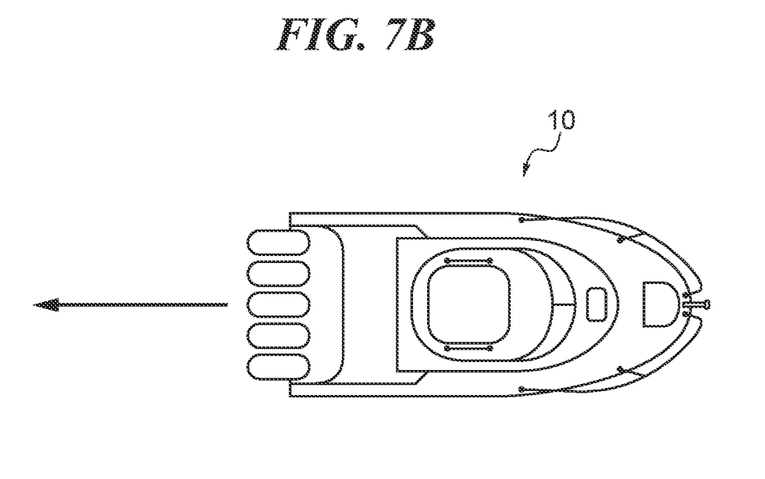

To compensate for this, while performing the deceleration control as illustrated in FIG. 7B, the BCU 14 maintains the acting direction of the thrust of each outboard motor 12 to be neutral, and makes the generated deceleration thrust directly opposite to the bow direction of the marine vessel 10. That is, the BCU 14 maintains the steering of the marine vessel 10 at a neutral position while performing the deceleration control. As a result, the entire generated deceleration thrust is used for deceleration of the speed in the bow direction, and the speed in the bow direction is efficiently reduced. Further, no yaw moment is generated in the marine vessel 10 to disturb the course of the marine vessel 10.

In the deceleration control process of FIGS. 4A and 4B, when the speed in the bow direction is the deceleration control end speed or less (YES in step S414) and the duration of the deceleration control is a predetermined period of time or more (YES in step S415), the BCU 14 ends the deceleration control.

Figure 8A:
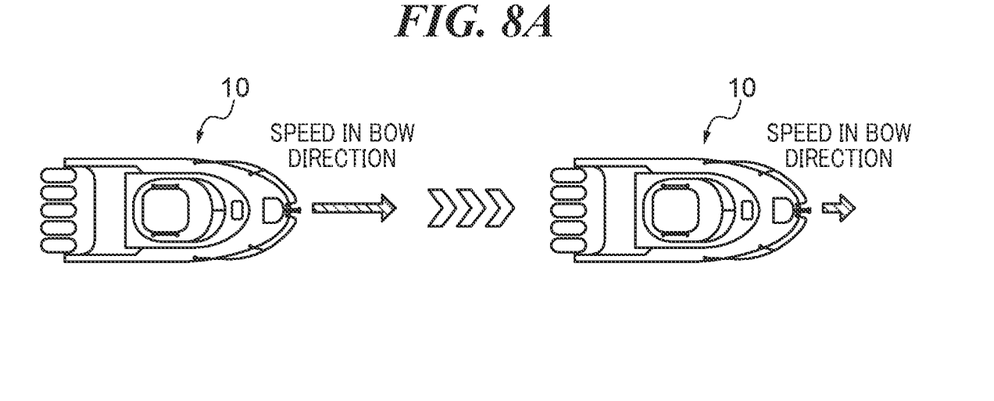
FIGS. 8A to 8C are diagrams for describing conditions for ending deceleration control.
Figure 8B:
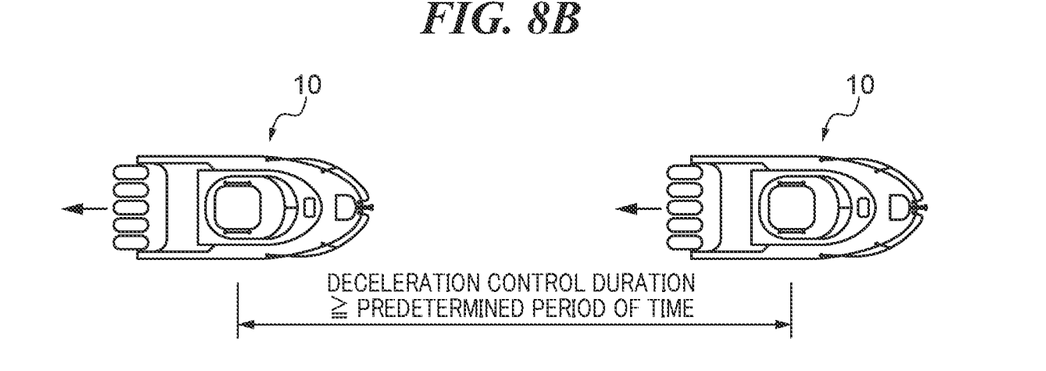
Figure 8C:
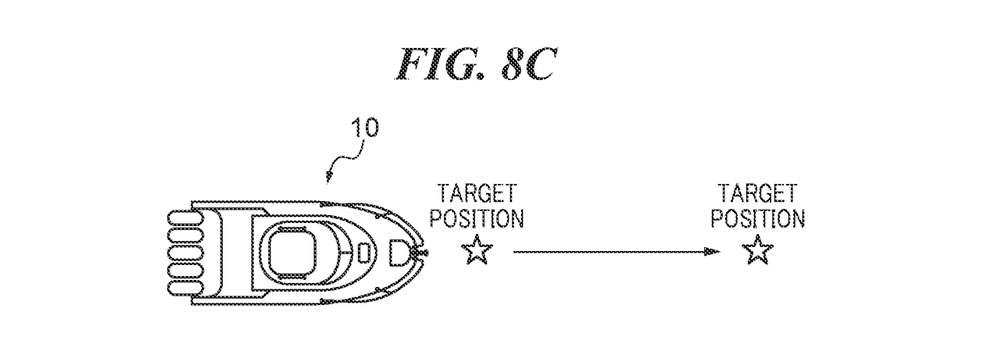

Alternatively, when the speed of the marine vessel 10 in the bow direction is the deceleration control end speed or less as illustrated in FIG. 8A, the BCU 14 may end the deceleration control without requiring other conditions. Alternatively, when the marine vessel 10 does not stop even when the deceleration control is performed for a predetermined period of time or more as illustrated in FIG. 8B, the BCU 14 may end the deceleration control without requiring other conditions.

Further, when the target position for dynamic positioning control is moved in the bow direction of the marine vessel 10 as illustrated in FIG. 8C too, the BCU 14 may end the deceleration control without requiring other conditions. This prevents a situation where the marine vessel 10 is hindered from reaching the changed target position due to the deceleration thrust.

According to a preferred embodiment of the present invention, while the dynamic positioning control of the marine vessel 10 is performed (e.g., when the marine vessel 10 has changed to a mode in which the marine vessel 10 is kept at a certain location), deceleration control is performed to reduce a speed of the marine vessel 10 in the bow direction. This prevents the marine vessel 10 from departing too far from the target position to perform the dynamic positioning control, and as a result, it is possible to smoothly perform the dynamic positioning control. Since the marine vessel 10 hardly passes the target position due to the execution of the deceleration control, the BCU 14 is able to notify a vessel operator of the abnormality by a buzzer or the MFD 15 when the marine vessel 10 passes the target position, but the notification of abnormality is rarely given. Therefore, a vessel operator is able to comfortably enjoy navigation of the marine vessel 10.

In a preferred embodiment of the present invention, when the speed of the marine vessel 10 in the bow direction is less than the predetermined value, deceleration control is not performed. That is, if the speed of the marine vessel 10 in the bow direction is less than a speed in the bow direction at which the marine vessel 10 is able to be kept in the vicinity of the target position even with a reverse thrust that is able to be generated during dynamic positioning control, the deceleration thrust is not generated. Thus, the marine vessel 10 is stopped gently.

Further, in a preferred embodiment of the present invention, when the speed of the marine vessel 10 in the bow direction becomes equal to or less than the deceleration control end speed, the deceleration control is ended. That is, if the speed of the marine vessel 10 in the bow direction is equal to or less than a speed in the bow direction at which the marine vessel 10 is able to be stopped in a short period of time even with a reverse thrust that is able to be generated during dynamic positioning control, the deceleration thrust is not generated. Thus, the marine vessel 10 is similarly stopped gently.

In a preferred embodiment of the present invention, when the duration of deceleration control is a predetermined period of time or more, the deceleration control is ended. That is, the deceleration control is ended in a case in which the marine vessel 10 does not stop even after the elapse of a period of time sufficient to stop the marine vessel 10 by the deceleration control under no influence of the tidal current on the marine vessel 10, from the start of deceleration control. Such a case corresponds to a case in which the marine vessel 10 is actually pushed away by a strong tidal current and is not stopped by any deceleration thrust. Then, as a result of the termination of the deceleration control, the marine vessel 10 passes by the target position. At this time, the BCU 14 notifies a vessel operator of the abnormality by a buzzer or the MFD 15. As a result, the vessel operator learns that this area of the sea is such that the marine vessel 10 is pushed away by the occurrence of a strong tidal current or the like and the marine vessel 10 hardly stops, and that this area of the sea is inappropriate for performing dynamic positioning control.

Further, in a preferred embodiment of the present invention, the BCU 14 performs dynamic positioning control even after the deceleration control is ended. As a result, the marine vessel 10 does not depart from the target position after stopping in the vicinity of the target position, and even if deceleration control is ended before the marine vessel 10 reaches the target position, the marine vessel 10 gently reaches the target position by the dynamic positioning thrust.

While preferred embodiments of the present invention have been described above, the present invention is not limited to the above-described preferred embodiments, and various modifications and changes can be made within the scope of the gist of the present invention.

For example, even when each outboard motor 12 is equipped not only with an engine but also an electric motor as a prime mover, or is equipped with only an electric motor, preferred embodiments of the present invention are able to be used for the marine vessel 10 including such an outboard motor or motors as long as the electric motor is controlled by the BCU 14 or the remote control ECU 22. Further, even in a case in which the marine vessel 10 includes at least one inboard/outboard motor or at least one inboard motor instead of the outboard motors 12 as power sources, preferred embodiments of the present invention are able to be used for such a marine vessel as long as at least one inboard/outboard motor or at least one inboard motor is controlled by the BCU 14 or the remote control ECU 22.

Furthermore, in the Fish Point mode, in order to give priority to quietness, some outboard motors 12 may be stopped. When this setting is made, deceleration control is not performed. This ensures quietness.

In a preferred embodiment of the present invention described above, deceleration control is performed only when the mode set during dynamic positioning control is either the Fish Point mode or the Stay Point mode. However, the deceleration control may be performed when the mode set during dynamic positioning control is the Drift Point Track mode as well.

Figure 9:
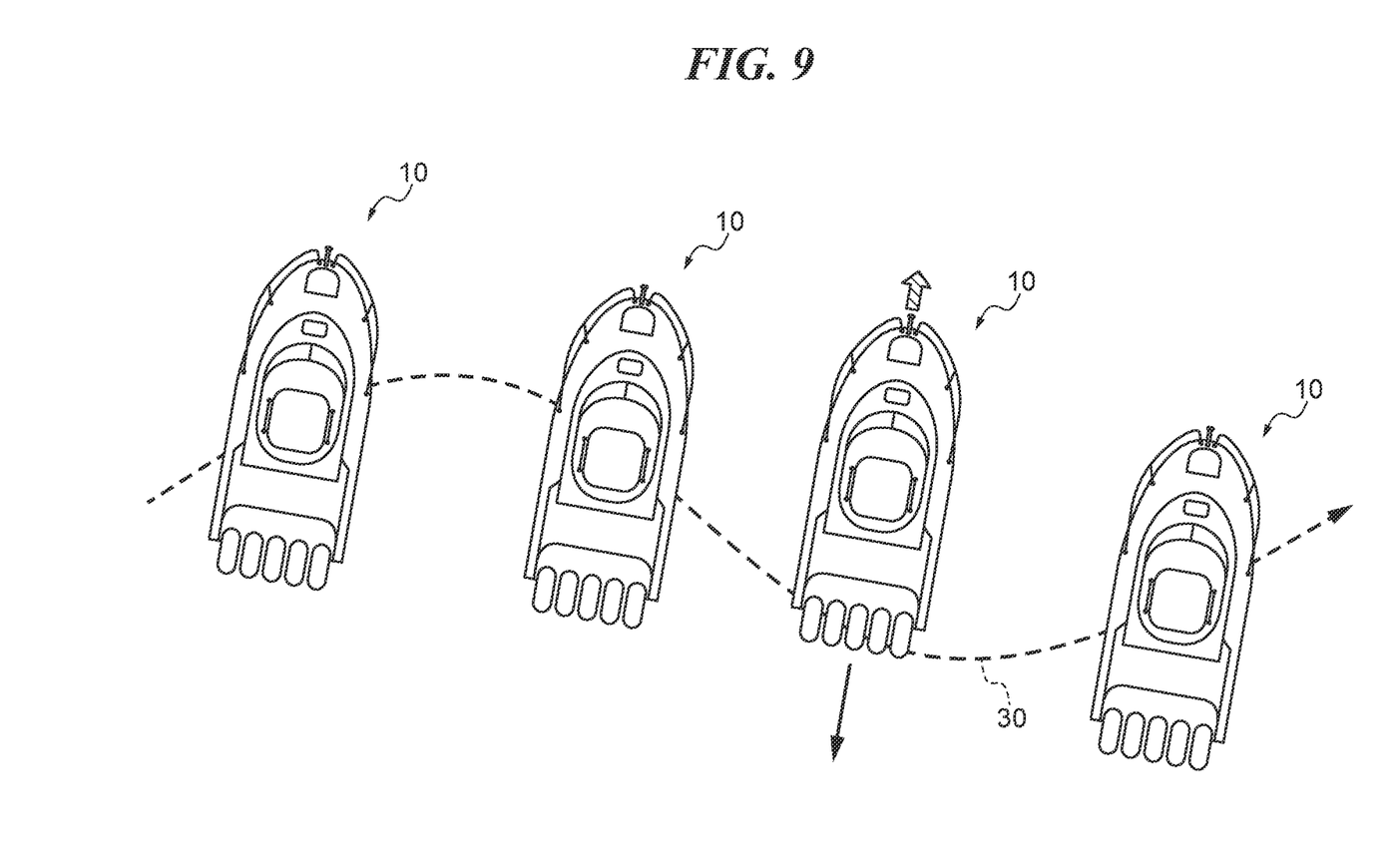
FIG. 9 is a diagram for describing deceleration control in a Drift Point Track mode.

FIG. 9 is a diagram for describing a deceleration control in the Drift Point Track mode. During the Drift Point Track mode, the marine vessel 10 is guided along a route 30 previously input by a vessel operator on the MFD 15, and when the marine vessel 10 deviates from the route 30 in the bow direction (third from left in FIG. 9) due to the speed of the marine vessel 10 in the bow direction (hatched arrow in FIG. 9), deceleration control is performed and a deceleration thrust (black arrow in FIG. 9) acts on the marine vessel 10. That is, in a case in which the marine vessel 10 has changed to a mode in which the marine vessel 10 is guided along a predetermined route, when the marine vessel 10 deviates in the bow direction from the predetermined route, the BCU 14 performs deceleration control to prevent the marine vessel 10 from moving in the bow direction. As a result, the movement of the marine vessel 10 in the bow direction is minimized or prevented, and the marine vessel 10 is returned to the route 30.

Note that the present invention may be implemented by reading a program to implement the functions of the above-described preferred embodiments from the memory 31 provided in the marine propulsion control system 13, a ROM provided in the BCU 14, or the like and executing the program by the BCU 14, or may be implemented by supplying a program to implement the functions of the above-described preferred embodiments in the marine propulsion control system 13 through a network or a storage medium and executing the supplied program by the BCU 14. Further, the preferred embodiments of the present invention may also be implemented by a circuit (e.g., ASIC) that performs one or more functions of the BCU 14.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A propulsion control system for a marine vessel including at least one power source to generate thrust, the propulsion control system comprising:
   a memory;
   a controller coupled to the memory and configured or programmed to:
      control movement of the marine vessel by the at least one power source; and
      while performing dynamic positioning control of the marine vessel, perform deceleration control to reduce a bow direction speed of the marine vessel; and
   at least one power source controller to control the at least one power source; wherein
   the controller is configured or programmed to transmit, to the at least one power source controller, a total value of a first control value corresponding to a thrust of the at least one power source necessary to perform the dynamic positioning control, and a second control value corresponding to the thrust of the at least one power source necessary to perform the deceleration control.

2. The propulsion control system according to claim 1, wherein the controller is configured or programmed to acquire the bow direction speed of the marine vessel, and perform the deceleration control in a case in which the bow direction speed of the marine vessel is a first predetermined speed or more.

3. The propulsion control system according to claim 1, wherein the controller is configured or programmed to adjust the first control value and the second control value so that the at least one power source generates thrust based on the total value in a direction opposite to a bow direction of the marine vessel.

4. The propulsion control system according to claim 1, wherein the controller is configured or programmed to determine whether or not to perform the deceleration control according to information about specifications of the at least one power source and a number of the at least one power source provided on the marine vessel.

5. The propulsion control system according to claim 1, wherein the controller is configured or programmed to change the second control value so that a thrust of the at least one power source necessary to perform the deceleration control gradually increases at a start of the deceleration control.

6. The propulsion control system according to claim 5, wherein an increase change rate of the thrust of the at least one power source necessary to perform the deceleration control varies according to specifications of the marine vessel.

7. The propulsion control system according to claim 5, wherein the controller is configured or programmed to maintain the thrust of the at least one power source necessary to perform the deceleration control at a predetermined value, when the increasing thrust of the at least one power source necessary to perform the deceleration control reaches the predetermined value while performing the deceleration control.

8. The propulsion control system according to claim 7, wherein the predetermined value varies according to the specifications of the at least one power source.

9. The propulsion control system according to claim 1, wherein the controller is configured or programmed to end the deceleration control when the bow direction speed of the marine vessel becomes equal to or less than a second predetermined speed while performing the deceleration control.

10. The propulsion control system according to claim 1, wherein the controller is configured or programmed to end the deceleration control when a duration of the deceleration control reaches a predetermined period of time or more.

11. The propulsion control system according to claim 1, wherein the controller is configured or programmed to perform the dynamic positioning control even after ending the deceleration control.

12. The propulsion control system according to claim 1, wherein the controller is configured or programmed to maintain steering of the marine vessel at a neutral position while performing the deceleration control.

13. A propulsion control system for a marine vessel including at least one power source to generate thrust, the propulsion control system comprising:
a memory; and
a controller coupled to the memory and configured or programmed to:
control movement of the marine vessel by the at least one power source; and
while performing dynamic positioning control of the marine vessel, perform deceleration control to reduce a bow direction speed of the marine vessel; wherein
the controller is configured or programmed to end the deceleration control when a duration of the deceleration control reaches a predetermined period of time or more, and the predetermined period of time varies according to a number of the at least one power source provided on the marine vessel.

14. A propulsion control system for a marine vessel including at least one power source to generate thrust, the propulsion control system comprising:
a memory; and
a controller coupled to the memory and configured or programmed to:
control movement of the marine vessel by the at least one power source; and
while performing dynamic positioning control of the marine vessel, perform deceleration control to reduce a bow direction speed of the marine vessel; wherein
the controller is configured or programmed to end the deceleration control when a target position of the marine vessel for the dynamic positioning control is moved in a bow direction of the marine vessel.

15. A propulsion control system for a marine vessel including at least one power source to generate thrust, the propulsion control system comprising:
a memory;
a controller coupled to the memory and configured or programmed to:
control movement of the marine vessel by the at least one power source; and
in a case in which the marine vessel has changed to a mode in which the marine vessel is kept at a certain location, perform deceleration control to reduce a bow direction speed of the marine vessel; and
at least one power source controller to control the at least one power source; wherein
the controller is configured or programmed to transmit, to the at least one power source controller, a total value of a first control value corresponding to a thrust of the at least one power source necessary to perform the dynamic positioning control, and a second control value corresponding to the thrust of the at least one power source necessary to perform the deceleration control.

16. A marine vessel comprising:
at least one power source to generate thrust;
a memory;
a controller coupled to the memory and configured or programmed to:
control movement of the marine vessel by the at least one power source; and
while performing dynamic positioning control of the marine vessel, perform deceleration control to reduce a bow direction speed of the marine vessel; and
at least one power source controller to control the at least one power source; wherein
the controller is configured or programmed to transmit, to the at least one power source controller, a total value of a first control value corresponding to a thrust of the at least one power source necessary to perform the dynamic positioning control, and a second control value corresponding to the thrust of the at least one power source necessary to perform the deceleration control.

17. A marine vessel comprising:
at least one power source to generate thrust;
a memory;
a controller coupled to the memory and configured or programmed to:

control movement of the marine vessel by the at least one power source; and in a case in which the marine vessel has changed to a mode in which the marine vessel is kept at a certain location, perform deceleration control to reduce a bow direction speed of the marine vessel; and at least one power source controller to control the at least one power source; wherein the controller is configured or programmed to transmit, to the at least one power source controller, a total value of a first control value corresponding to a thrust of the at least one power source necessary to perform the dynamic positioning control, and a second control value corresponding to the thrust of the at least one power source necessary to perform the deceleration control.

18. A propulsion control system for a marine vessel including at least one power source to generate thrust, the propulsion control system comprising:

a memory; and a controller coupled to the memory and configured or programmed to:

control movement of the marine vessel by the at least one power source; and in a case in which the marine vessel has changed to a mode in which the marine vessel is guided along a predetermined route, when the marine vessel deviates from the predetermined route in a bow direction of the marine vessel, perform deceleration control to prevent the marine vessel from moving in the bow direction.

19. A marine vessel comprising:

at least one power source to generate thrust;

a memory; and a controller coupled to the memory and configured or programmed to:

control movement of the marine vessel by the power source; and in a case in which the marine vessel has changed to a mode in which the marine vessel is guided along a predetermined route, when the marine vessel deviates from the predetermined route in a bow direction of the marine vessel, perform deceleration control to prevent the marine vessel from moving in the bow direction.

\* \* \* \* \*